(12) United States Patent
Lantz et al.

(10) Patent No.: US 7,792,010 B2
(45) Date of Patent: Sep. 7, 2010

(54) SCANNING SYSTEM FOR A PROBE STORAGE DEVICE

(75) Inventors: Mark A. Lantz, Adliswil (CH); Hugo E. Rothuizen, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 444 days.

(21) Appl. No.: 11/955,554

(22) Filed: Dec. 13, 2007

(65) Prior Publication Data

US 2009/0154329 A1  Jun. 18, 2009

(51) Int. Cl.
*G11B 9/00* (2006.01)
(52) U.S. Cl. ...................................... 369/126
(58) Field of Classification Search ................ 369/126, 369/170; 365/145; 977/943, 947
See application file for complete search history.

(56) References Cited

U.S. PATENT DOCUMENTS

| | | | |
|---|---|---|---|
| 5,009,473 A | | 4/1991 | Hunter et al. |
| 5,834,864 A | * | 11/1998 | Hesterman et al. ..... 310/40 MM |
| 5,986,381 A | | 11/1999 | Hoen et al. |
| 6,501,210 B1 | * | 12/2002 | Ueno .......................... 310/331 |
| 6,583,524 B2 | | 6/2003 | Brandt |
| 6,639,313 B1 | | 10/2003 | Martin et al. |
| 6,911,667 B2 | * | 6/2005 | Pichler et al. .................. 257/40 |
| 6,953,985 B2 | | 10/2005 | Lin et al. |
| 6,969,635 B2 | * | 11/2005 | Patel et al. ................... 438/107 |
| 7,132,721 B2 | | 11/2006 | Platt et al. |
| 7,372,025 B2 | | 5/2008 | Hoen et al. |
| 2003/0057803 A1 | | 3/2003 | Hartwell |
| 2004/0245462 A1 | * | 12/2004 | Binnig et al. ................ 250/306 |
| 2007/0268099 A1 | | 11/2007 | Jeong et al. |

OTHER PUBLICATIONS

J. Fernando Alfaro and Gary K. Fedder, Actuation for Probe-Based Mass Data Storage, p. 1-4, Carnegie Mellon University, Pittsburgh.
Y. Lu et al., Design, Fabrication and Control of a Micro X-Y Stage with Large Ultra-thin Film Recoding Media Platform, Proceedings of the 2005 IEEE/ASME International Conference on Advanced Intelligent Mechatronics, Jul. 2005, p. 19-24, Monterey.
Mark A. Lantz et al., A Vibration Resistant Nanopositioner for Mobile Parallel-Probe Storage Applications, Journal for Microelectronical Systems, Feb. 2007, p. 130-139, vol. 16, No. 1, IEEE.

* cited by examiner

*Primary Examiner*—Joseph H Feild
*Assistant Examiner*—Nicholas Lee
(74) *Attorney, Agent, or Firm*—Cantor Colburn LLP; Stephen Kaufman

(57) ABSTRACT

A probe storage device includes a scanner chip body having at least a mechanical ground portion provided with first and second opposing surfaces and a scan table suspension portion. A scan table including a top surface and a back surface is moveably mounted to the scan table suspension portion. A probe array chip is fixedly mounted to the first surface of the mechanical ground portion. A first plate is also fixedly mounted to the first surface of the mechanical ground portion. A second plate, having a main body portion including first and second opposing surfaces, is fixedly mounted to the second surface of the mechanical ground portion. A desiccant layer is positioned upon one of the first surface of the second plate, the back surface of the scan table and one of the first and second surfaces of the mechanical ground portion.

5 Claims, 3 Drawing Sheets

SCANNING SYSTEM FOR A PROBE STORAGE DEVICE

BACKGROUND OF THE INVENTION

1. Field of the Invention

This invention relates to the art of probe storage devices and, more particularly, to a scanning system for a probe storage device incorporating a desiccant layer.

2. Description of Background

Parallel probe-based data-storage systems are currently being developed for future data-storage applications. A parallel probe-based system employs a large array of atomic-force microscopic probes that read, write and erase data on a storage medium carried by an X/Y scanning system. The large array of probes enables very high storage densities to be achieved. Moreover, by operating the array of probes in parallel, high data transfer rates are also achievable. The high storage capacity, combined with rapid transfer rates, enables the storage system to be built into a small package that is ideal for mobile data storage applications.

Mobile storage systems present a variety of engineering challenges. First, mobile storage systems must be robust against vibration and shock. Second, mobile storage systems must be capable of operating on a restricted power budget. A mobile probe based storage system should be capable of maintaining sub-nanometer tracking performance while being subjected to mechanical shocks that create accelerations that approach 10's of g's. However, making a mechanical device more robust, i.e., capable of withstanding high accelerations, typically requires making components stiffer. By making the components stiffer, power consumption for certain components, e.g., actuators, will increase and thus render the device less desirable for mobile applications. In addition to above described challenges, probe storage devices must include durable packaging. Any moisture, dust, dirt and the like entering the probe storage device would be detrimental to efficient operation and, ultimately, lead to a shorter service life.

SUMMARY OF THE INVENTION

The shortcomings of the prior art are overcome and additional advantages are provided through the provision of a probe storage device constructed in accordance with exemplary embodiments of the present invention. The probe storage device includes a scanner chip body having at least a mechanical ground portion provided with first and second opposing planar surfaces, a scan table suspension portion, and first and second coil mounting cavities. A scan table including a top surface and a back surface is moveably mounted to the scan table suspension portion. A first coil mounted in the first coil mounting cavity and a second coil mounted in the second coil mounting cavity. A probe array chip is fixedly mounted to the first surface of the mechanical ground portion. A first plate, having main body section including first and second opposing surfaces, is also fixedly mounted to the first surface of the mechanical ground portion. A second plate, having a main body portion including first and second opposing surfaces, is fixedly mounted to the second surface of the mechanical ground portion. A desiccant layer is positioned upon at least one of the first surface of the second plate, the back surface of the scan table and one of the first and second surfaces of the mechanical ground portion. The desiccant layer is configured to absorb any moisture present in the probe storage device.

Additional features and advantages are realized through the techniques of exemplary embodiments of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION OF THE INVENTION

Figure 1:
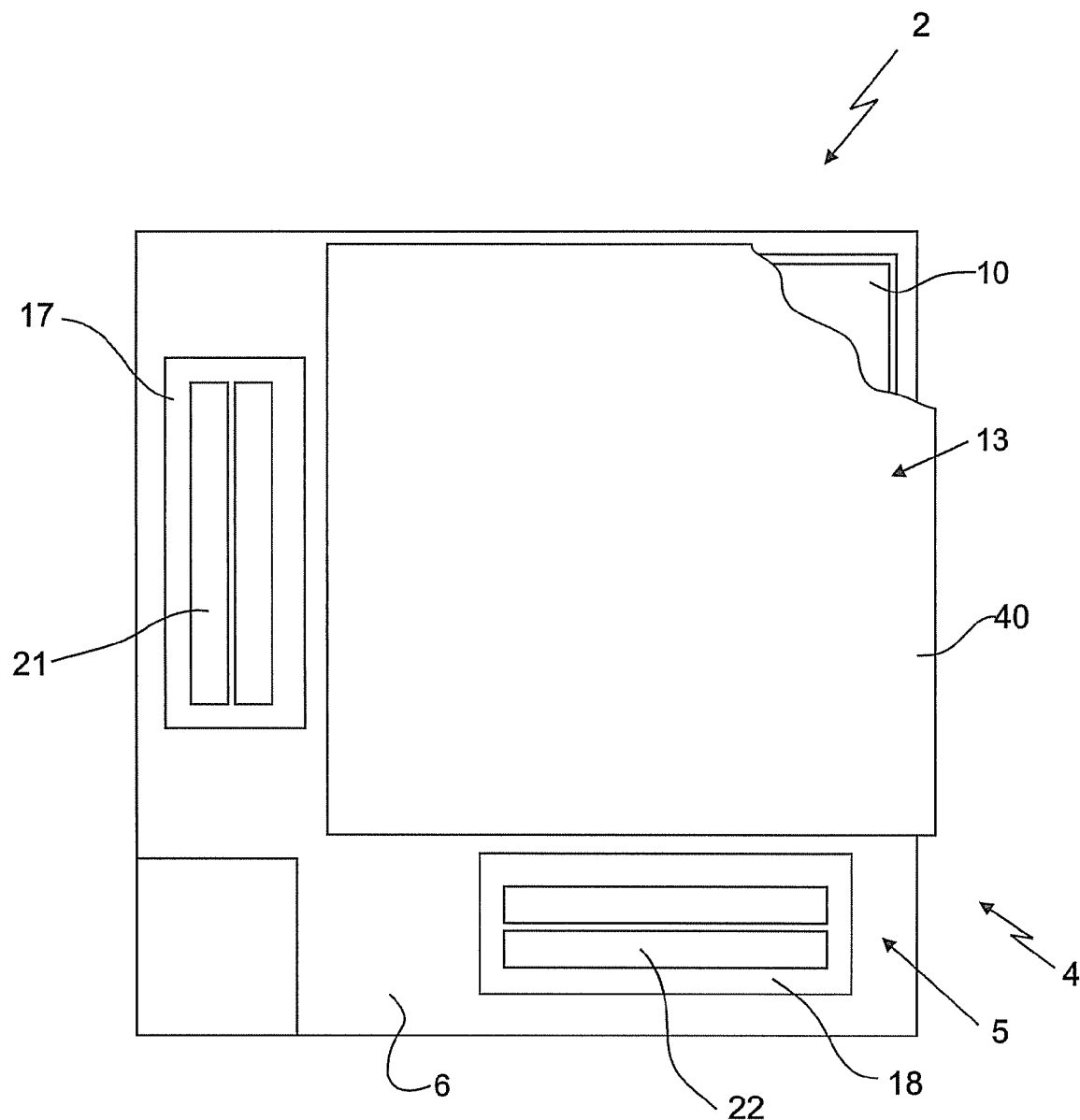
FIG. 1 is a partially cut-away plan view of a probe storage device constructed in accordance with an exemplary embodiment of the present invention.
Figure 2:
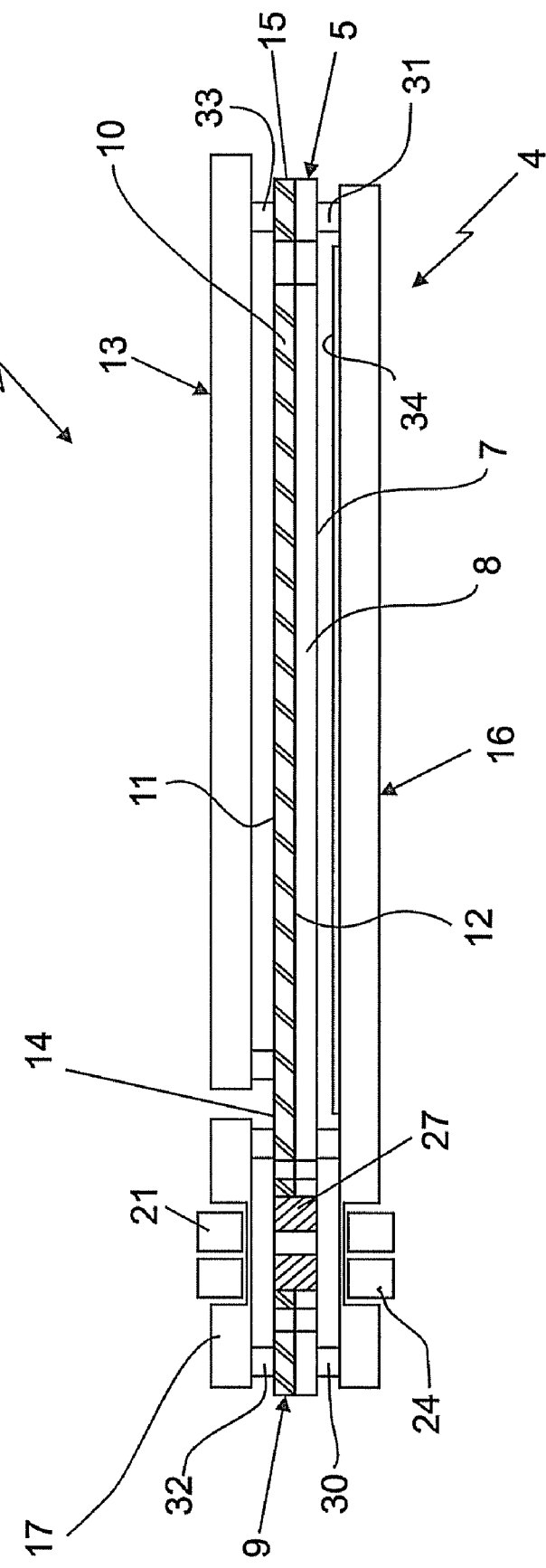
FIG. 2 is a cross-sectional side view of the probe storage device of FIG. 1.

With initial reference to FIGS. 1 and 2, a scanning system for a probe storage device is generally indicated at 2. Scanning system 2 includes a scanner chip body 4 having an anchor or mechanical ground portion 5 having a first surface 6 and a second surface 7, and a table suspension portion 8. Scanning system 2 also includes a table layer 9 from which a scan table 10 is formed. Scan table 10 includes a top surface 11 and a back surface 12 and is mounted to table suspension portion 8 so as to be shiftable relative to mechanical ground portion 5. Scanning system 2 also includes a probe array chip 13 that is fixedly mounted to mechanical ground portion 5 through sections of the table layer 9 indicated at 14 and 15. An insulating layer (not shown) is sandwiched between table layer 8 and suspension layer 6. Scanner chip 4 also includes a base plate 16 as well as first and second top plates 17 and 18. First top plate 17 houses a first magnet 21, while second top plate 18 houses a second magnet 22. In a similar manner, base plate 16 houses a pair of magnets one of which is indicated at 24. Magnets 21 and 22 in top plates 17 and 18 and magnet 24 in base plate 16 are positioned relative to a pair of coils one of which is indicated at 27. That is, magnets 21 and 24 are vertically aligned with coil 27 being arranged therebetween. Base plate 16, scanner chip body 4, and top plates 17 and 18 as well as array chip 13 are connected to one another through a plurality of anchor points or stand-offs, four of which are indicated at 30-33. Anchor points 30-33 provide a rigid support and establish a desired spaced relationship between base plate 16 and table layer 9, between array chip 13 and table layer 9, and between magnets 21 and 24.

In accordance with the exemplary embodiment shown, base-plate 16 includes a desiccant layer 34. Desiccant layer 34 is configured to absorb any moisture that may be present within scanning system 2. Desiccant layer 34 is formed from at least one of a silica gel, calcium sulfate, calcium aluminosilicate clay, activated alumina and a molecular sieve such as, for example, zeolite. With this construction, scanning system 2 is protected from moisture throughout an operational life of the device, even if seal quality is poor or degrades overtime. Thus, the overall service life of scanning system 2 is improved while maintaining a compact package that is particularly well suited for mobile storage applications.

Figure 3:
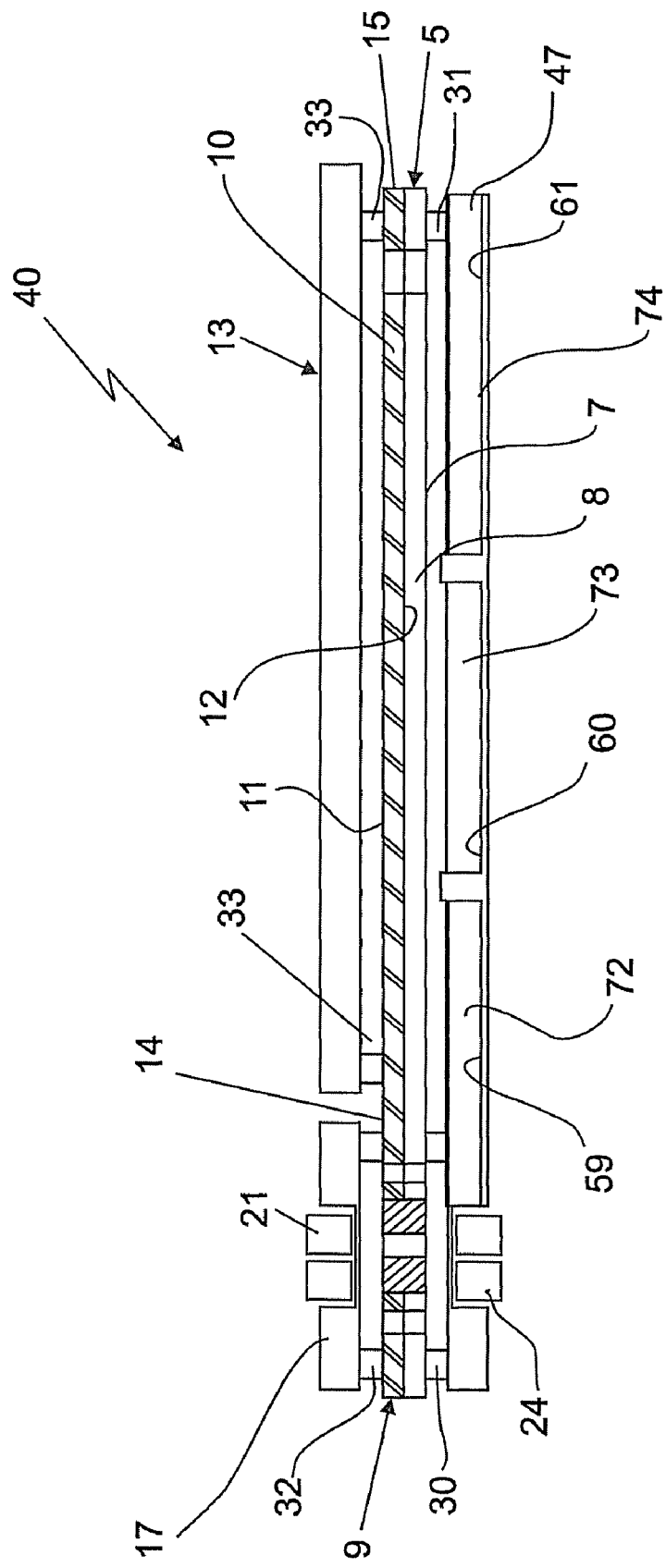
FIG. 3 is a cross-sectional side view of a probe storage device constructed in accordance with another exemplary embodiment of the present invention.

In accordance with another embodiment of the present invention illustrated in FIG. 3, where like reference numbers represent corresponding parts in the respective views, a scanning system 40 includes a base plate 47. Base plate 47 is formed with a plurality of cavities 59-61. Cavities 59-61 are selectively etched into base plate 47 to a desired depth and provided with a corresponding desiccant layer 72-74. By forming cavities 59-61 in base plate 47 and incorporating desiccant layers 72-74 directly into cavities 59-61, there is no appreciable increase in overall thickness of scanning system 40. Thus, desiccant volume is increased, further improving service life of scanning system 2 as well as robustness against leaks, without increasing package size.

In addition to providing the desiccant layer on base plate 47, it should be apparent that a desiccant layer could also be deposited onto a back portion of table layer 8 or on a surface of the suspension layer. In any event, it should appreciated that the present invention provides a simple, cost effective means of increasing an overall service life of a probe storage device by providing desiccant within the scanner system to maintain a low humidity environment over an operational life of the device. Of course, in addition to mobile storage applications, the scanning system could be used in various other storage applications.

While the preferred embodiments of the invention have been described, it will be understood that those skilled in the art, both now and in the future, may make various improvements and enhancements which fall within the scope of the claims which follow. These claims should be construed to maintain the proper protection for the invention first described.

The invention claimed is:

1. A probe storage device comprising:
   a scanner chip body including at least a mechanical ground portion having first and second opposing planar surfaces, a scan table suspension portion and, first and second coil mounting cavities;
   a scan table moveably mounted to the scan table suspension portion, the scan table including a top surface and a back surface;
   a first coil mounted in the first coil mounting cavity;
   a second coil mounted in the second coil mounting cavity;
   a probe array chip fixedly mounted to the first surface of the mechanical ground portion;
   a first plate having main body section including first and second opposing surfaces, the second surface being fixedly mounted to the first surface of the mechanical ground portion;
   a second plate having a main body portion including first and second opposing surfaces, the first surface being fixedly mounted to the second surface of the mechanical ground portion; and
   a desiccant layer positioned upon at least one of the first surface of the second plate, the back surface of the scan table and one of the first and second surfaces of the mechanical ground portion, wherein the desiccant layer is configured to absorb any moisture present in the probe storage device.

2. The probe storage device according to claim 1, wherein the desiccant layer is applied to the first surface of the second plate.

3. The probe storage device according to claim 2, wherein the second plate includes a plurality of pockets, the desiccant layer being positioned in each of the plurality of pockets.

4. The probe storage device according to claim 1, wherein the desiccant layer is deposited on the back surface of the scan table.

5. The probe storage device according to claim 1, wherein the desiccant layer is formed from one of a calcium sulfate, a silicon gel, a calcium aluminosilicate clay, activated aluminum, and a molecular sieve.

* * * * *